United States Patent [19]

Ichiyanagi et al.

[11] Patent Number: 5,338,449
[45] Date of Patent: Aug. 16, 1994

[54] BRINE REFINING APPARATUS

[75] Inventors: Shigeo Ichiyanagi, Kanagawa; Shojiro Iwai; Masahiro Deguchi, both of Osaka, all of Japan

[73] Assignees: Turumisoda Kabushiki Kaisya, Kanagawa; Miura Engineering International Kabushiki Kaisya, Osaka, both of Japan

[21] Appl. No.: 942,062

[22] Filed: Sep. 9, 1992

[30] Foreign Application Priority Data

Sep. 12, 1991 [JP] Japan .................................. 3-260497
Sep. 23, 1991 [JP] Japan .................................. 3-272023

[51] Int. Cl.⁵ ............................................. B01D 21/08
[52] U.S. Cl. .................................... 210/205; 210/519; 210/521
[58] Field of Search ............... 210/202, 205, 207, 208, 210/259, 521, 522, 519

[56] References Cited

U.S. PATENT DOCUMENTS

| | | | |
|---|---|---|---|
| 653,012 | 7/1900 | Koyl | 210/521 |
| 1,020,013 | 3/1912 | Arbuckle | 210/521 |
| 1,458,805 | 6/1923 | Christensen | 210/521 |
| 3,491,892 | 1/1970 | McCann | 210/521 |
| 3,903,000 | 9/1975 | Miura | 210/522 |
| 4,194,976 | 3/1980 | Robinsky | 210/521 |
| 4,221,671 | 9/1980 | Meurer | 210/522 |
| 4,957,628 | 9/1990 | Schulz | 210/521 |

FOREIGN PATENT DOCUMENTS

| | | |
|---|---|---|
| 2452950 | 12/1980 | France . |
| 56-26449 | 6/1956 | Japan . |
| 53-90066 | 8/1978 | Japan . |
| 61-101416 | 5/1986 | Japan . |
| 8912492 | 12/1989 | PCT Int'l Appl. . |
| 1101262 | 7/1984 | U.S.S.R. . |
| 1457957 | 2/1989 | U.S.S.R. . |
| 1450407 | 12/1973 | United Kingdom . |

OTHER PUBLICATIONS

M. Miura "Recent Advances of Liquid-Solid Separation Technology in Japan" Aug. 28–31, 1977 vol. I, The Second Pacific Chemical Engineering Congress, p. 656.

Primary Examiner—Christopher Upton
Attorney, Agent, or Firm—Lowe, Price, LeBlanc & Becker

[57] ABSTRACT

An apparatus for refining brine including calcium and magnesium ions. Caustic alkali and carbonate alkali are added to the brine to produce a raw solution including flocks. The brine refining apparatus includes a settling tank having a supply of the raw solution for sinking the flocks to separate the flocks from the brine. A number of sheet members arranged in spaced-facing relation to each other within the settling tank. Each of the sheet members has a surface inclined at a predetermined angle with respect to a vertical plane crossing the corresponding sheet member.

3 Claims, 7 Drawing Sheets

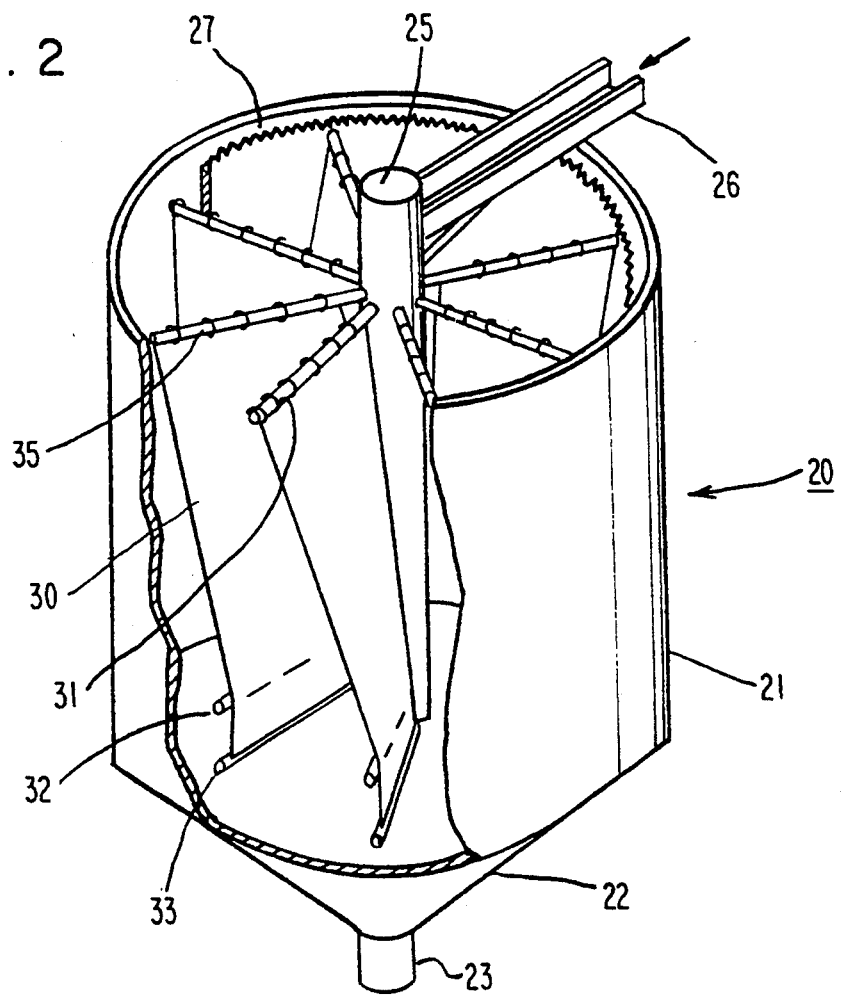
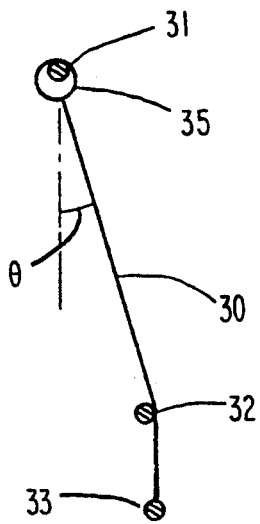

BRINE REFINING APPARATUS

BACKGROUND OF THE INVENTION

This invention relates to an apparatus for refining brine including calcium and magnesium ions.

An ion exchange membrane method or the like has been used widely to produce sodium hydroxide by electrolyzing raw brine such as raw salt dissolved in water. In general, raw brine includes impurities such as calcium ions, magnesium ions and the like. Therefore, it is required to remove the impurities and refine the raw brine before the electrolysis of the raw brine. For this purpose, sodium hydroxide and sodium carbonate are added to the raw brine to crystalize the calcium and magnesium ions. The resulting calcium carbonate and magnesium hydroxide particles are condensed into the form of flocks in the presence of a high molecular condensate. The resulting raw solution is introduced into a settling tank where the flocks are settled and separated from the supernatant solution. However, the flocks have a specific gravity substantially the same as the specific gravity (1.2) of saturated brine and drift in the settling tank with convection currents caused by a great difference between the temperature of the solution surface from which heat is radiated to the atmosphere and the temperature of the solution at the bottom of the setting tank. The residence time required for the flocks to sink and separate from the raw solution is as long as six to ten hours. It is the current practice to improve the brine refining efficiency by increasing the size of the settling tank. However, this results in a space consuming brine refining apparatus.

SUMMARY OF THE INVENTION

A main object of the invention is to provide an improved brine refining apparatus which consumes less space and exhibits greater brine refining efficiency.

There is provided, in accordance with the invention, an apparatus for refining brine including calcium and magnesium ions. The brine refining apparatus comprises means for adding caustic alkali and carbonate alkali to the brine to produce a raw solution including flocks, a settling tank having a supply of the raw solution for sinking the flocks to separate the flocks from the brine, and a number of sheet members arranged in spaced-facing relation to each other within the settling tank. Each of the sheet members has a surface inclined at a predetermined angle with respect to a vertical plane crossing the corresponding sheet member.

BRIEF DESCRIPTION OF THE DRAWINGS

This invention will be described in greater detail by reference to the following description taken in connection with the accompanying drawings, in which:

FIG. 2 is a perspective partially cutaway view showing a thickener used in the brine refining apparatus of FIG. 1;

FIG. 3 is a sectional view showing an angle at which the sheet member is inclined;

DETAILED DESCRIPTION OF THE INVENTION

Figure 1:
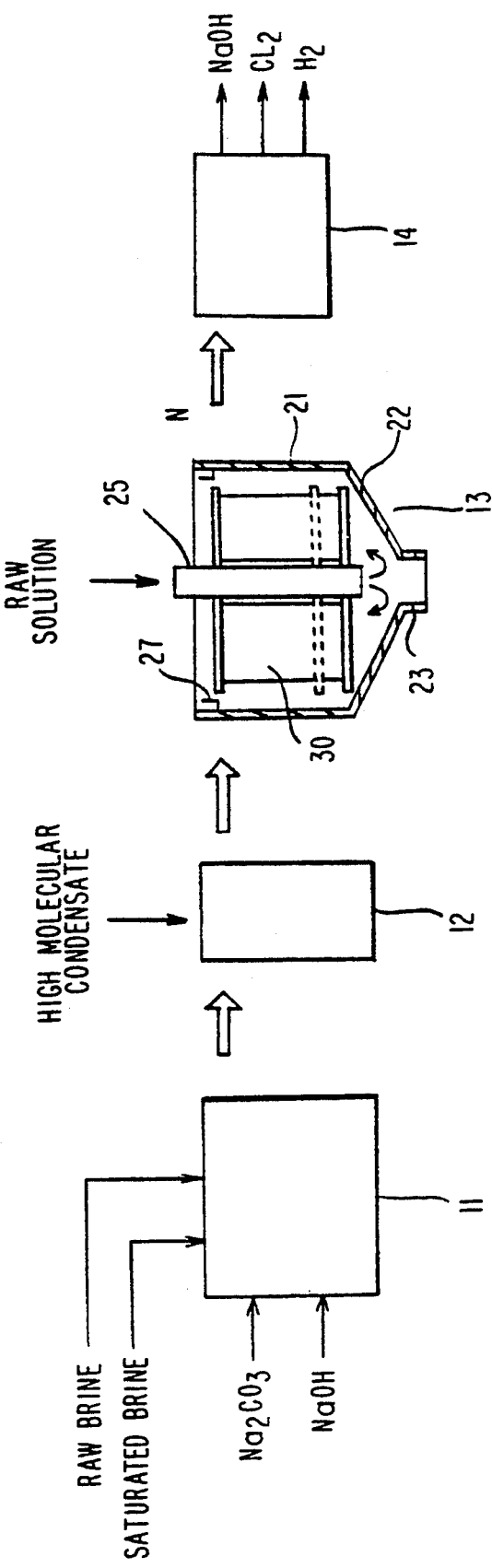
FIG. 1 is a schematic diagram showing one embodiment of a brine refining apparatus made in accordance with the invention.

With reference to the drawings, wherein like numerals refer to like parts in the several views, and in particular to FIGS. 1, there is shown a schematic diagram of a brine refining apparatus embodying the invention. The brine refining apparatus, generally designated by the numeral 10, includes a reaction tank 11 into which raw solution is introduced. The raw solution includes raw brine (raw salt dissolved in water) and return brine (saturated brine). The reaction tank 11 also has a supply of sodium carbonate and sodium hydroxide to crystalize the calcium ions, magnesium ions and other impurity ions included in the raw brine. The raw solution is then introduced from the reaction tank 11 to a flock forming tank 12 which has a supply of precipitant in the form of high molecular condensate to condense the calcium carbonate and magnesium hydroxide produced in the reaction tank 11. Following this, the raw solution is introduced from the flock forming tank 12 to a thickener 13 where the flocks included in the raw solution introduced thereinto are settled. The raw solution with the impurities being removed therefrom is introduced from the thickener 13 into an electrolytic tank 14 where it is electrolyzed, such as by an ion exchange membrane method, to produce sodium hydroxide solution.

Referring to FIG. 2, the thickener 13 includes a settling tank 20 having a cylindrical upper portion 21, an outlet portion 23, and a diverging bottom portion 22 between the upper and outlet portions 21 and 23. The outlet portion 23, which is normally closed, is opened when it is required to discharge the flocks accumulated in the diverging bottom portion 22. A vertical inlet conduit 25 is placed centrally in the cylindrical upper portion 21. The vertical inlet conduit 25 is connected at its upper end to an inlet channel 26 through which the raw solution is introduced from the flock forming tank 12 into the inlet conduit 25. The vertical inlet conduit 25 opens at its lower end into the lower end of the cylindrical upper portion 21. The numeral 27 designates an annular outlet channel provided on the inner surface of the cylindrical upper portion 21 at a position near the upper open end of the settling tank 20 so that the supernatant solution can overflow into the annular outlet channel 27.

The inlet conduit 25 defines an annular chamber along with the inner surface of the cylindrical upper portion 21 of the settling tank 20. For example, the annular chamber has a width of about 3.5 meters. The annular chamber, which is defined between the vertical inlet conduit 25 and the cylindrical upper portion 21, is separated by a number of sheet members 30 equally spaced circumferentially. The sheet members 30 are made of a flexible material such as synthetic resin. Each of the sheet members 30 is inclined at an angle with respect to a vertical plane including the axis of the vertical inlet conduit 25 and crossing the sheet member 30 so as to increase the effective area for separation. For this purpose, the inlet conduit 25 has first and second support rods 31 and 32 mounted thereon. The first and second support rods 31 and 32 extend outwardly in the horizontal direction from the vertical inlet conduit 25. The first support rods 31 are secured at positions equally spaced circumferentially on the vertical inlet conduit 25 so that they are arranged in a common horizontal plane crossing the vertical inlet conduit 25 near the upper end thereof. Similarly, the second support rods 32 are secured at positions equally spaced circumferentially on the vertical inlet conduit 25 so that they are arranged in a common horizontal plane crossing the vertical inlet conduit 25 near the lower end of thereof.

Preferably, each of the sheet members 30 has a width substantially the same as the distance between the outer peripheral surface of the vertical inlet conduit 25 and the inner peripheral surface of the cylindrical upper portion 21. The sheet member 30 is secured at its one end to ring members 35 mounted around the first support rod 31, as shown in FIG. 3, and at the other end thereof to a weight rod 33 extending nearly the full length of the other end of the sheet member 30. The sheet member 30 is draped over the corresponding one of the second support rods 32 which is angularly deviated to make a predetermined angle $\theta$ with respect to the corresponding first support rod 31, as shown in FIG. 3. Preferably, the predetermined angle $\theta$ is in the range of 15° to 30°.

The operation is as follows:

Raw solution, which includes raw brine and saturated brine, is introduced into the reaction tank 11 where the calcium and magnesium ions included in the raw brine are crystallized in the presence of sodium carbonate and sodium hydroxide. The raw solution is then introduced from the reaction tank 11 into the flock forming tank 12 where the resulting calcium carbonate and magnesium hydroxide particles are condensed to produce flocks in the presence of a precipitant. The raw solution is then introduced, along with the flocks, through the inlet channel 26 into the vertical inlet conduit 25 and discharged into the settling tank 20 toward the diverging bottom portion 22. The discharged raw solution flows upward through the annular chamber between the adjacent inclined sheet members 30 with the flocks settling toward the bottom of the settling tank 20. The supernatant solution separated from the flocks overflows into the annular outlet channel 27. Thereafter, the supernatant solution is introduced through an unshown sand filter into the electrolytic tank 14 where it is electrolyzed to produce sodium hydroxide, chlorine, and hydrogen.

Since the temperature of the raw solution is as high as 50° C., a great difference exists between the temperature of the solution surface from which heat is radiated to the atmosphere and the temperature of the solution at the bottom of the settling tank 20. The inclined sheet members 30 are effective to minimize the tendency of the convection currents resulting from such a great temperature difference. Furthermore, the inclined sheet members 30 increase the effective area for separation to a great extent and provide inclined surfaces along which the flocks fall toward the bottom of the settling tank 20. With the use of the inclined sheet members 30 arranged circumferentially in the settling tank 20, therefore, it is possible to increase the settling rate to a remarkable extent.

Figure 4:
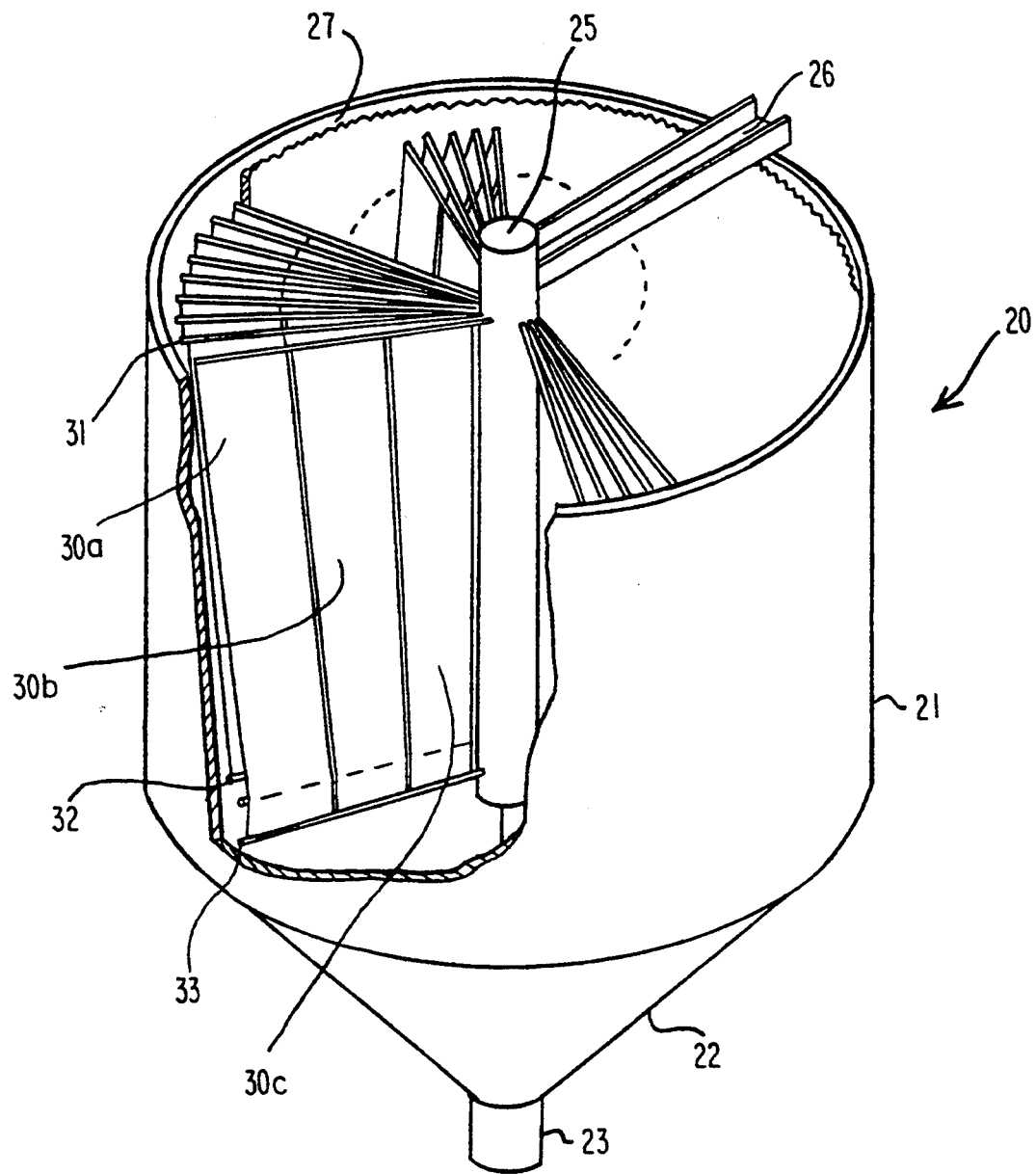
FIG. 4 is a perspective partially cutaway view showing a modified form of the inclined sheet member arrangement.
Figure 5:
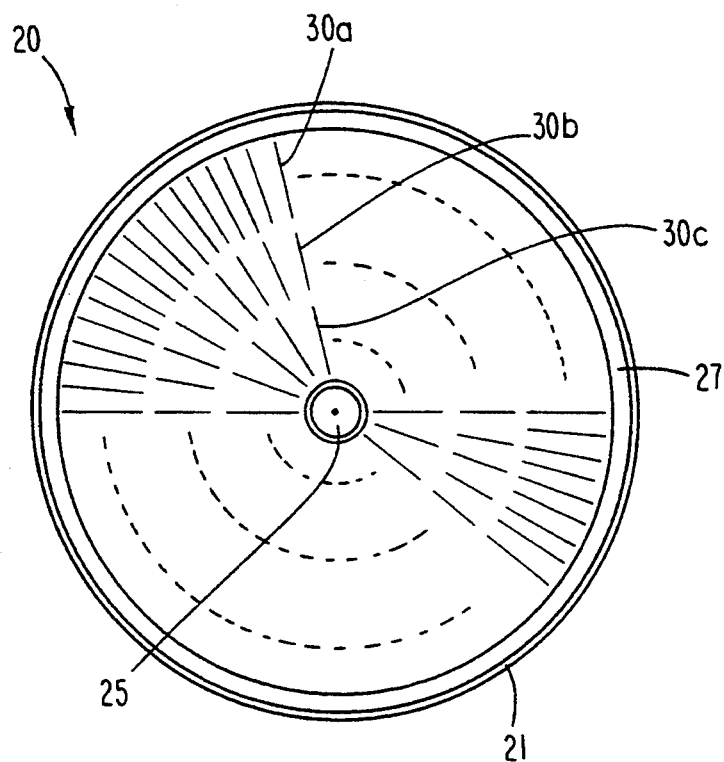
FIG. 5 is a plan view of the thickener of FIG. 4.

Referring to FIGS. 4 and 5, there is shown a modified form of the inclined sheet member arrangement. In this modification, each of the inclined sheet members 30 is comprised of at least one of outer, intermediate and inner sheet members 30a, 30b and 30c having substantially the same width. That is, the inclined sheet members 30 is classified into three types. Each of the sheet members of the first type has outer, intermediate and inner sheet members 30a, 30b and 30c secured at their one ends to the corresponding first support rod 31 and at the other ends thereof to the corresponding weight rod 33. Each of the sheet members of the second type has outer and intermediate sheet members 30a and 30b secured at their one ends to the corresponding first support rod 31 and at the other end thereof to the corresponding weight rod 33. Each of the sheet members of the third type has an outer sheet member 30a secured at its one end to the corresponding first support rod 31 and at the other end thereof to the corresponding weight rod 33. In this embodiment, the number of the inclined sheet members 30 is greater on the outer side of the cylindrical upper portion 21 than on the inner side of the cylindrical upper portion 21. It is, therefore, possible to achieve effective separation of flocks from the raw solution by reducing the distance between two adjacent inclined sheet members 30 also on the outer side of the cylindrical upper portion 21.

Tests were conducted to prove the effect of the invention. The thickener used was of the type illustrated in FIGS. 4 and 5 including a 240 m$^3$ settling tank 20 provided with 160 outer sheet members 30a, 80 intermediate sheet members 30b and 40 inner sheet members 30c. Each sheet member was inclined at 20° with respect to a plane including the vertical inlet conduit 25 and crossing the sheet member. The width of the sheet members 30a, 30b and 30c was 1 meter, the diameter of the vertical inlet conduit 25 was 1.5 meters, the diameter of the cylindrical upper portion 21 was 8.5 meters, and the flow rate of the raw solution was 120 m$^3$/hr. The residence time was about 2 hours. It was found with the eye that the supernatant solution had a high degree of clarification and had almost no particles. For comparison of the effect obtainable by the invention, tests were conducted for a thickener of the conventional type including a 240 m$^3$ settling tank having no inclined spaced member. The residence time was about 6 hours. This residence time is three times longer than that obtained by the invention.

Figure 6:
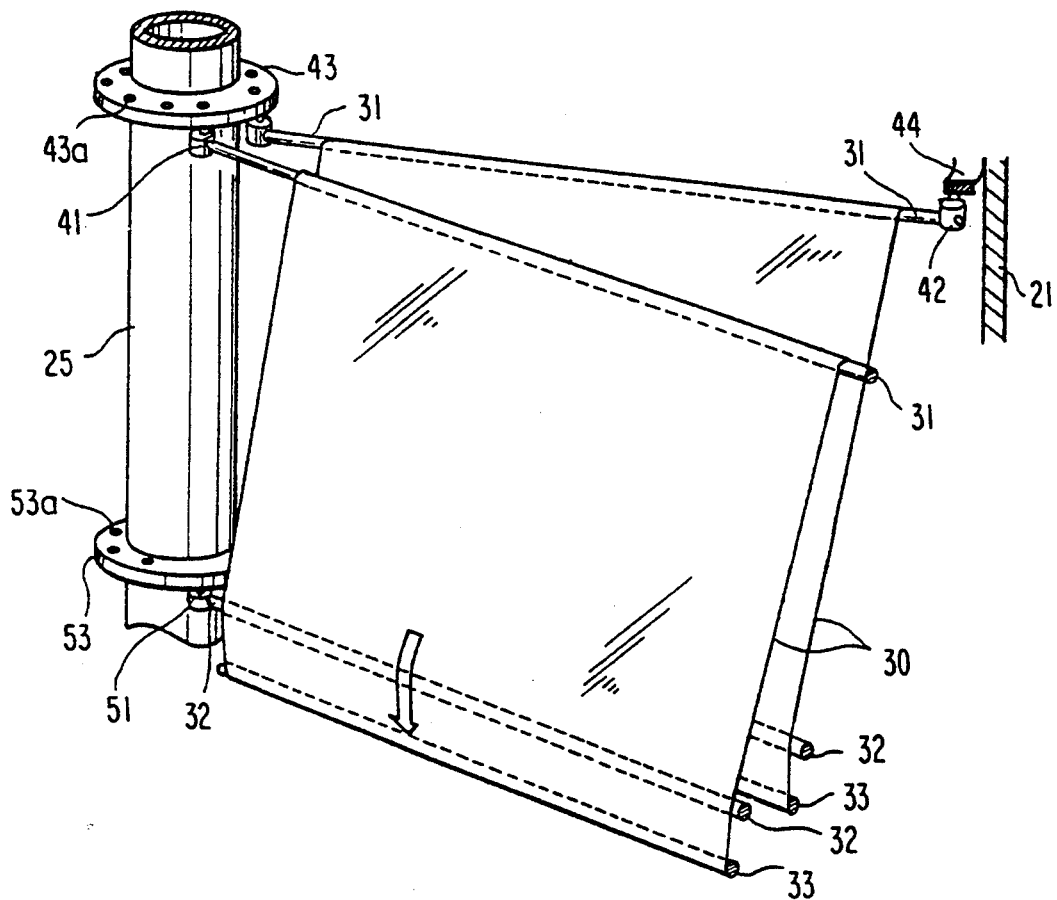
FIG. 6 is a fragmentary perspective view showing a modified form of the thickener.
Figure 7:
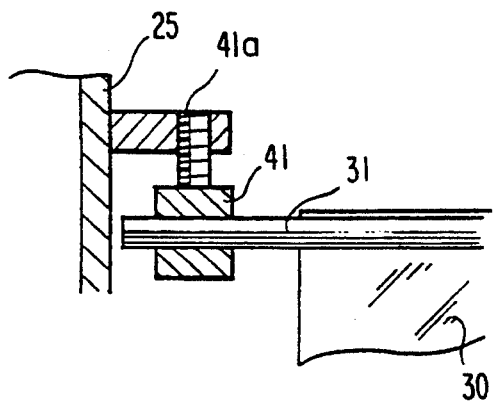
FIG. 7 is a fragmentary sectional view showing a sheet member supporting structure used in the thickener of FIG. 6.
Figure 8:
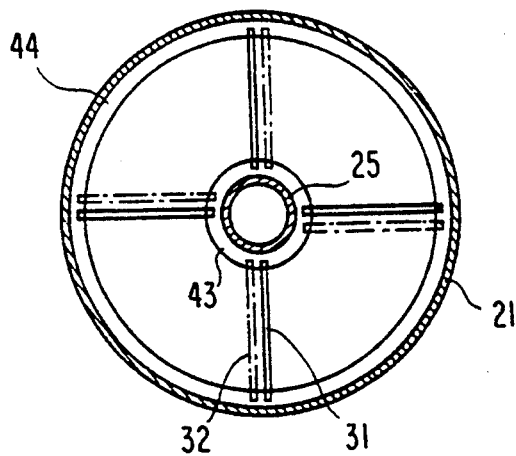
FIG. 8 is a plan view showing the inclined sheet member arrangement of the thickener of FIG. 6.

Referring to FIGS. 6, 7 and 8, there is shown a modified form of the thickener which is substantially the same as shown in FIG. 2 except for the inclined sheet member support structure. Like reference numerals have been applied to FIGS. 6, 7 and 8 with respect to the equivalent components shown in FIG. 2. In this modification, each of the first support rods 31 is fixedly inserted at its one end in a bracket 41 having an externally threaded shaft 41a extending therefrom and at the other end thereof in another bracket 42 having an externally threaded shaft. A first upper ring 43 is fixedly disposed in surrounding relationship about the periphery of the vertical inlet conduit 25. A second upper ring 44 is fixedly disposed on the inner surface of the cylindrical upper portion 21 of the settling tank 20. The first upper ring 43 has a number of internally threaded holes 43a equally spaced circumferentially for threadably engagement with the externally threaded shafts 41a of the respective brackets 41. The second upper ring 44 has a number of internally threaded holes equally spaced circumferentially for threadably engagement with the externally threaded shafts of the respective brackets 42. Similarly, each of the second support rods 32 is fixedly inserted at its one end in a bracket 51 having an externally threaded shaft extending therefrom and at the other end thereof in another bracket having an externally threaded shaft. A first lower ring 53 is fixedly disposed in surrounding relationship about the periphery of the vertical inlet conduit 25. A second lower rings (not shown) is fixedly disposed on the inner surface of the cylindrical upper portion 21 of the settling tank 20. The first lower ring 53 has a number of internally threaded holes 53a equally spaced circumferentially for threadably engagement with the externally threaded shafts of the respective brackets 51. The second upper ring has a number of internally threaded holes equally spaced circumferentially for threadably engagement with the externally threaded shafts of the respective brackets.

Figure 9:
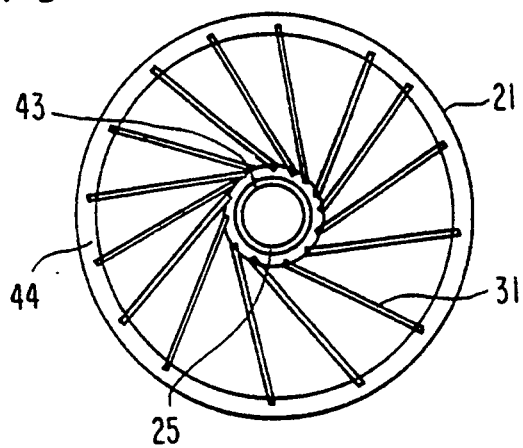
FIG. 9 is a plan view showing another inclined sheet member arrangement.

While the first support rods 31 are shown in FIG. 8 as arranged in parallel with the respective second support rods 32, it is to be understood that the invention is not limited to this arrangement. While each of the first support rods 31 is shown in FIG. 8, as directed toward the center of the vertical inlet conduit 25, it is to be understood that the first support rod may be inclined at a predetermined angle with respect to the line extending through the center of the vertical inlet conduit 25 and the corresponding one of the internally threaded holes 43a, as shown in FIG. 9.

Figure 10:
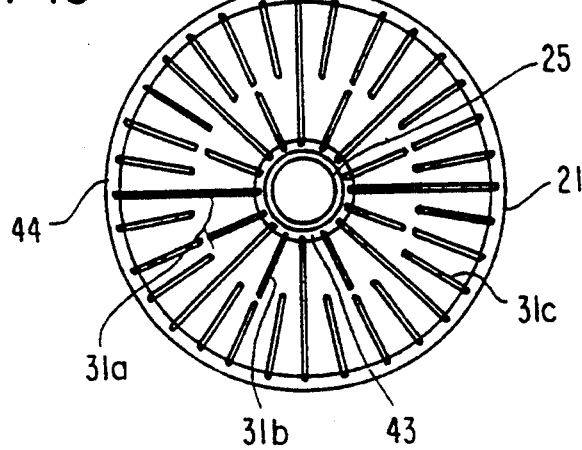
FIG. 10 is a plan view showing another inclined sheet member arrangement.
Figure 11:
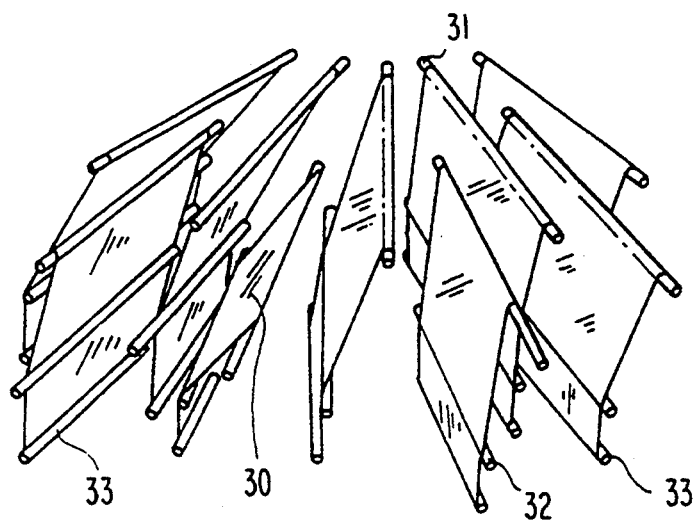
FIG. 11 is a fragmentary perspective view showing the inclined sheet member arrangement of FIG. 10.

Referring to FIGS. 10 and 11, there is shown another inclined sheet member arrangement which includes long first support rods supported between the first and second upper rings 43 and 44, short first support rods supported at their inner ends only by the first upper ring 43 and short first support rods supported at their outer ends only by the second upper ring 44. The sheet members 30 are inclined at a predetermined angle $\theta$ substantially in the same manner as described in connection with FIG. 6.

Figure 12:
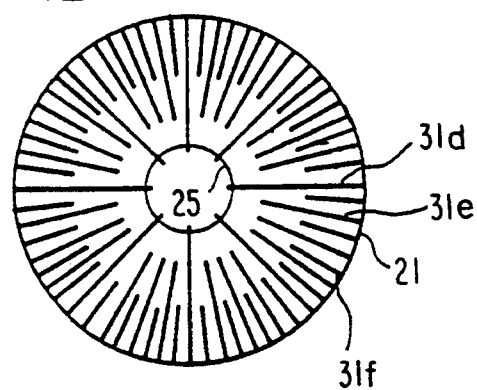
FIG. 12 is a plan view showing still another inclined sheet member arrangement.

Referring to FIG. 12, there is shown still another inclined sheet member arrangement which includes long first support rods supported between the first and second upper rings 43 and 44, intermediate first support rods supported at their outer ends only by the second upper ring 44, and short first support rods supported at their outer ends only by the second upper ring 44. The sheet members are inclined at a predetermined angle $\theta$ substantially in the same manner as described in connection with FIG. 6.

While the invention has been described in conjunction with specific embodiments thereof, it is evident that many alternatives, modifications and variations will be apparent to those skilled in the art. Accordingly, it is intended to embrace all alternatives, modifications and variations that fall within the scope of the appended claims.

What is claimed is:

1. An apparatus for refining brine including calcium and magnesium ions, comprising:
   a source of caustic alkali;
   a source of carbonate alkali;
   means for adding the caustic alkali and the carbonate alkali to the brine to produce a raw solution including flocks;
   a settling tank for receiving the raw solution and sinking the flocks to separate the flocks from the brine; the settling tank having a cylindrical wall having a peripheral inner surface, the settling tank having a vertical inlet conduit placed centrally in the cylindrical wall of the settling tank, the inlet conduit having an outer peripheral surface, the inlet conduit having an upper port through which the raw solution is introduced into the inlet conduit and a lower port through which the raw solution is discharged from the inlet conduit into the settling tank;
   a number of sheet members arranged in spaced-facing relation to each other within the settling tank, each of the sheet members having a surface inclined at a predetermined angle with respect to a vertical plane crossing the corresponding sheet member, the sheet members being arranged radially above the outlet port of the inlet conduit between the peripheral outer surface of the inlet conduit and the peripheral inner surface of the cylindrical wall;
   first support rods arranged between the outer peripheral surface of the inlet conduit and the inner peripheral surface of the cylindrical wall, each of the first support rods being secured at one end thereof to the outer peripheral surface of the inlet conduit or the inner peripheral surface of the cylindrical wall; and
   second support rods arranged below the first support rods between the outer peripheral surface of the inlet conduit and the inner peripheral surface of the cylindrical wall, each of the second support rods being secured at one end thereof to the outer peripheral surface of the inlet conduit or the inner peripheral surface of the cylindrical wall, the second support rods being angularly deviated to make the predetermined angle with respect to the corresponding first support rods;
   the sheet members having upper ends supported by the respective first support rods and lower ends secured to respective weight rods, the sheet members being draped over the respective second support rods.

2. The brine refining apparatus as claimed in claim 1, wherein a plurality of sheet members are arranged in each of segments divided radially between the outer peripheral surface of the inlet conduit and the inner peripheral surface of the cylindrical wall, the number of the sheet members provided in each of the segments increasing in a direction toward the inner peripheral surface of the cylindrical wall.

3. The brine refining apparatus as claimed in claim 1, further comprising at least one second sheet member provided between each pair of adjacent two sheet members near the inner peripheral surface of the cylindrical wall, the second sheet member having a width smaller than that of the sheet members.

* * * * *